(12) United States Patent
Jenkins (10) Patent No.: US 7,222,544 B1
(45) Date of Patent: May 29, 2007

(54) ELECTRONIC TORQUE-TOOL TESTER

(76) Inventor: Bradley G. Jenkins, 871 San Vicente Rd., Arcadia, CA (US) 91007

( * ) Notice: Subject to any disclaimer, the term of this patent is extended or adjusted under 35 U.S.C. 154(b) by 70 days.

(21) Appl. No.: 11/075,265

(22) Filed: Mar. 7, 2005

Related U.S. Application Data

(60) Provisional application No. 60/551,015, filed on Mar. 9, 2004.

(51) Int. Cl.
*B25B 23/14* (2006.01)
(52) U.S. Cl. .............................. 73/862.23; 73/862.21; 73/862.22; 73/862.26
(58) Field of Classification Search ............. 73/862.23
See application file for complete search history.

(56) References Cited

U.S. PATENT DOCUMENTS

| | | | | |
|---|---|---|---|---|
| 4,257,263 A | * | 3/1981 | Herrgen | ..................... 73/862.23 |
| 6,115,069 A | * | 9/2000 | Kuroki et al. | .............. 348/375 |
| 6,345,436 B1 | * | 2/2002 | Codrington | ................. 29/720 |
| D458,817 S | * | 6/2002 | Jenkins | ......................... D8/24 |

* cited by examiner

*Primary Examiner*—Edward Lefkowitz
*Assistant Examiner*—Freddie Kirkland, III
(74) *Attorney, Agent, or Firm*—Albert O. Cota (57) ABSTRACT

An electronic torque-tool tester (10) designed to verify that various mechanical, electrical and pneumatic torque tools such as a torque wrench, are correctly calibrated. The tester (10) includes a housing (50) that is bordered by a horizontal mounting plate (14) and a vertical mounting plate (36). From the front of the housing (50) extends a torque transducer (132) that converts a rotational mechanical force produced by the torque wrench, into a corresponding electrical signal (11) that is converted by an electronics circuit (130) into a corresponding display signal (17). The display signal (17) operates a digital display unit (146) from where the applied torque in inch/pounds or foot/pounds can be viewed. The digital display unit (146) is attached to an articulated display assembly (108) that can be rotated through a 90 to 350-degree arc and that allows the digital display unit (146) to also be rotated through a 90 to 350-degree arc. Thus, allowing the tester (10) to be placed in an optimum position to view the applied torque.

18 Claims, 6 Drawing Sheets

ELECTRONIC TORQUE-TOOL TESTER

This application claims priority of Provisional Patent Application No. 60/551,015 filed Mar. 9, 2004.

TECHNICAL FIELD

The invention pertains to the general field of testers for measuring the amount of torque applied by a torque tool such as a torque wrench or torque screwdriver. More particularly, the invention pertains to an electronic torque-tool tester having an articulated torque display that can be rotatably positioned for optimum viewing on a digital display.

BACKGROUND ART

One of the most effective and widely used tools are torque applying tools. Torque tools include mechanical, electrical and pneumatic torque tools, such as a torque wrench or a torque screwdriver. The reason torque tools are so effective and widely used is because they provide a means by which a threaded fastener can be tightened to a pre-determined value of tension. Previously, most torque tools utilized a mechanical design, with spring tension used to determine the amount of torque applied. As technology has improved, there are now torque tools that utilize electronic means for measuring the amount of torque applied by the torque wrench or torque screwdriver.

Regardless of which type of torque tool is utilized, they all must be calibrated at regular intervals to insure they are functioning effectively and accurately. The procedure for calibrating a torque tool typically requires that the tool be sent to a facility that specializes in torque tool calibration. The owner of the torque tool is usually required to pay for the shipping of the tool or tools both ways. Once the torque tool or tools arrive at the facility, they are calibrated and then shipped back to the owner. The time that is required to calibrate the torque tool can significantly vary, depending on the size and capabilities of the calibration facility, and the number of torque tools that are in line to be calibrated.

Obviously, any company or business that relies on torque tools must have a contingency plan in the event that their torque tools which are being calibrated might be unavailable for an extended period of time.

The solution to the problems associated with sending torque tools to a calibration facility is for the owner(s) of the torque tools to perform the calibration themselves. In the past, the equipment necessary to perform the calibration of torque applying tools was relatively expensive and required training to operate. Therefore, it was more economical for the owner of a small number of torque tools to send them to a facility for calibration.

The instant invention provides an effective, reliable and accurate means by which a person can quickly and easily calibrate torque tools. While it is necessary to learn to operate the instant invention, the learning process is significantly easier than previous torque tool testers. The benefits to an owner calibrating his/her torque tool or tools are substantial and include monetary savings, time saving and the security of maintaining the torque tool or tools on-site at all times.

A search of the prior art patents and industry literature did not disclose any electronic torque-tool testers that read on the claims of the instant invention.

DISCLOSURE OF THE INVENTION

The electronic torque-tool tester is designed to provide an expedient, effective and reliable method for testing and calibrating torque applying tools such as torque wrenches and torque screwdrivers. In its basic design, the torque tool tester is comprised of:

1. A torque transducer having means for converting a rotational mechanical force that is produced by a torque applying tool, into a corresponding electrical signal, 2. An electronics circuit having means for converting the electrical signal into a corresponding display signal, and 3. A digital display unit having means for processing the digital signal and producing a digital display indicative of the torque being produced by the torque applying tool. The digital display unit is rotatably attached to an articulated display assembly that can be laterally rotated either clockwise or counter clockwise through a 90 to 350-degree arc. Likewise, the digital display unit can also be rotated either clockwise or counter clockwise through a 90 to 350-degree arc.

The electronic torque-tool tester is contained within an enclosure that includes a horizontal mounting plate having two mounting bores on each end, a vertical mounting plate also have two mounting bores on each end, and a housing that is integrally attached to the horizontal mounting plate and the vertical mounting plate.

The housing includes an upper horizontal section and a front vertical section. The upper horizontal section has a rotary collar bore that is dimensioned to rotatably retain the articulated display assembly. The front vertical section has a torque transducer bore that is dimensioned to rotatably and captively retain the torque transducer. The torque transducer can be calibrated in torque values ranging from inch/pounds to foot/pounds.

The enclosure with the housing are designed to be attached to a horizontal surface by inserting a set of screws or bolts into the two mounting bores located on the horizontal mounting plate. When the enclosure is attached to a horizontal surface, the torque transducer extends horizontally from the front vertical section of the housing, and the articulated display assembly extends vertically from the housing's upper horizontal section. The enclosure with the housing can also be attached to a horizontal surface by inserting screws or bolts into two mounting bores located on the vertical mounting plate. When the vertical mounting plate of the enclosure is attached to a horizontal surface, the torque transducer extends vertically from the front vertical section of the housing, and the articulated display assembly extends horizontally from the housing's upper horizontal section.

When the horizontal mounting plate is attached to a horizontal surface, the tester is optimally positioned to test torque wrenches. Likewise, when the vertical mounting plate is attached to the horizontal surface, the tester is optimally positioned to test torque screwdrivers.

The articulated display assembly that is featured in the design of the electrical torque tool tester is comprised of a hollow rotary neck that is dimensioned to be rotatably inserted into the rotary collar bore located on the upper horizontal section of the housing. The hollow rotary neck includes an inner end that terminates within the housing, and an outer end that is angularly truncated and that extends above the housing.

The hollow rotary neck also includes and an outer rotary collar. The inner rotary collar is dimensioned to be placed over and attached to the inner end of the hollow rotary neck.

The inner rotary collar also has a pair of horizontally oriented bores into which is threaded a pair of bolts. The bolts function to secure the inner rotary collar and to provide a stop that limits the lateral rotation of the hollow rotary neck when the bolts abut against the front vertical section of the housing. The outer rotary collar is dimensioned to be placed over and attached to the outer end of the hollow rotary neck to limit the vertical displacement of the hollow rotary neck.

The electronic circuit in addition to including the torque transducer also includes:

1. A signal conditioner having means for receiving and amplifying the electrical signal from the torque transducer and producing a corresponding analog signal,
2. An analog-to-digital converter having means for converting the analog signal into a corresponding digital signal,
3. A microcontroller that operates in combination with firmware. The microcontroller has means for receiving and processing the digital signal and producing a plurality of display signals that each correspond to a specific torque related value as produced by the torque applying tool,
4. The digital display unit, and
5. A power source that applies a regulated voltage to the electronics circuit.

In view of the above disclosure it is the primary object of the invention to produce an electronic torque-tool tester that provides an efficient and expedient method for testing and calibrating mechanical, electrical and pneumatic torque applying tools.

In addition to the primary object of the invention it is also an object of the invention to produce an electronic torque-tool tester that:

can be easily calibrated to read torque in various units of torque values,
is reliable, accurate and easily maintained,
includes large, easily readable digital characters,
is easily attached to a flat work station,
can be operated with various power source designs,
reduces downtime and saves money by reducing unneeded calibrations, and
is cost effective from both a manufacturer's and a consumer's point of view.

These and other objects and advantages of the present invention will become apparent from the subsequent detailed description of the preferred embodiment and the appended claims taken in conjunction with the accompany drawings.

BEST MODE FOR CARRYING OUT THE INVENTION

The best mode for carrying out the invention is presented in terms of a preferred embodiment for an electronic torque-tool tester that is used to verify the torque applied by any mechanical, electrical or pneumatic torque applying tool. For the purpose of discussion, the torque applying tool will be limited to a torque wrench and a torque screwdriver.

The preferred embodiment of the electronic torque-tool tester 10, as shown in FIGS. 1–10, is comprised of six major elements: an enclosure 12, a housing 50, an articulated display assembly 108, an electronics circuit 130, a digital display unit 146, and a power source 190.

Figure 1:
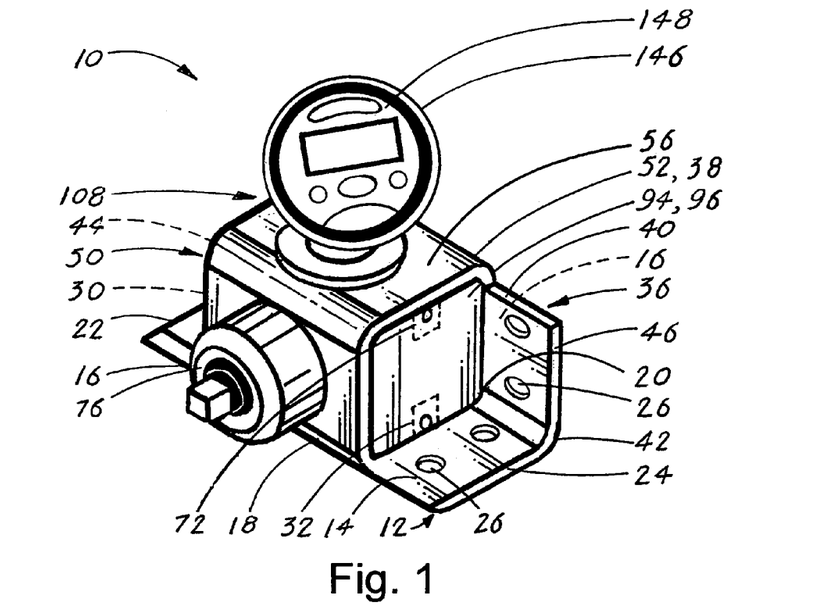
FIG. 1 is a perspective view of an electronic torque-tool tester.
Figure 2:
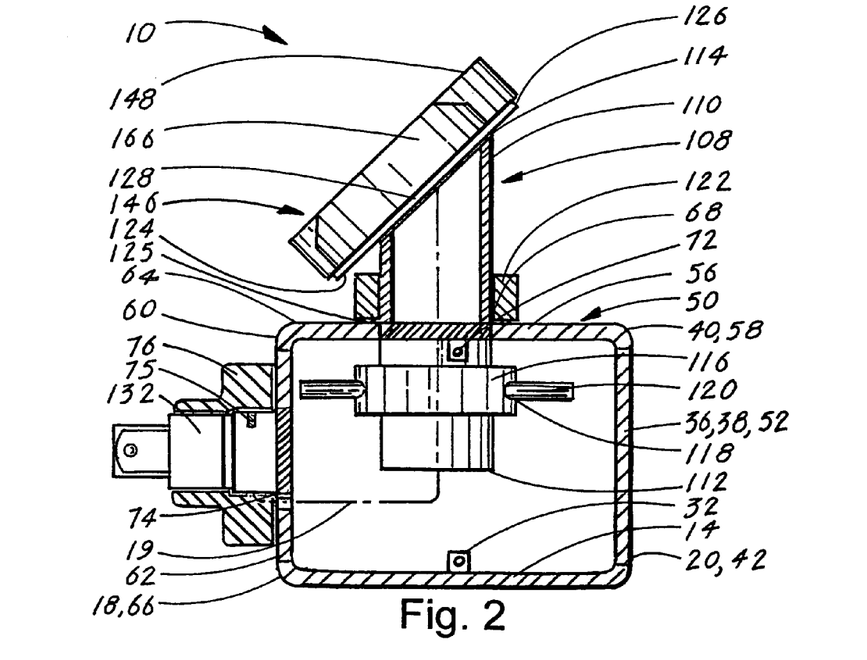
FIG. 2 is a side elevational and partial cross-sectional view of the tester.
Figure 3:
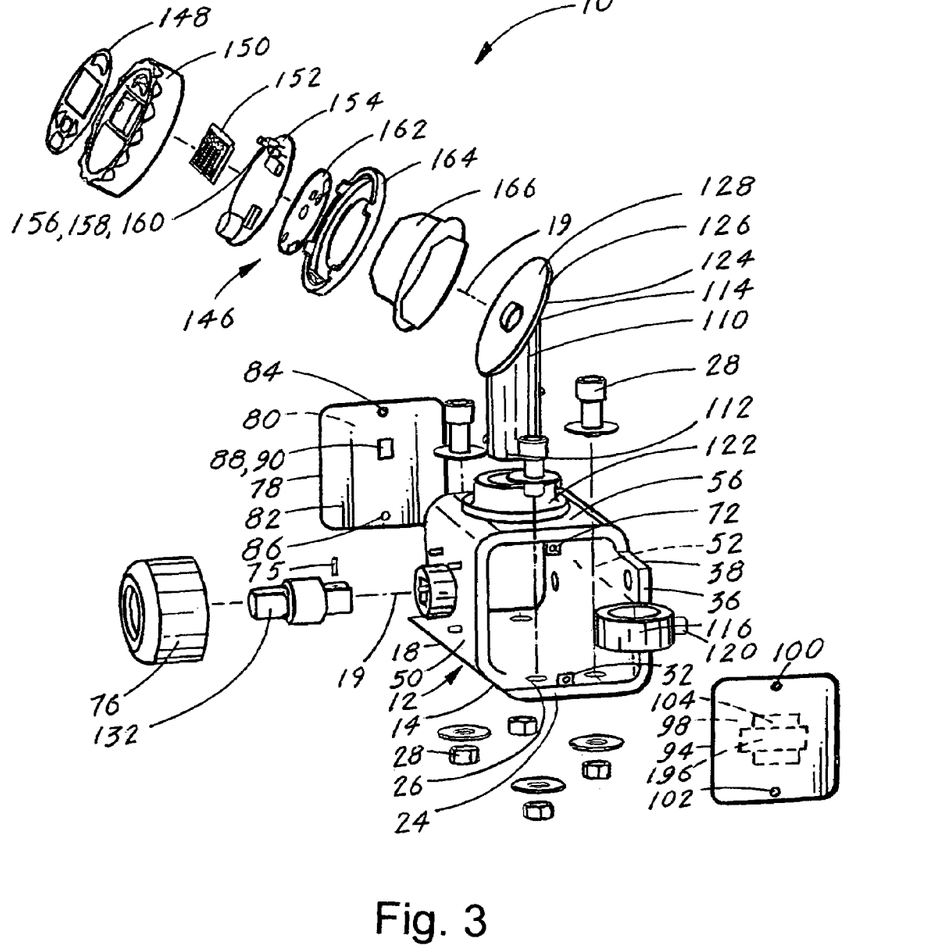
FIG. 3 is an exploded perspective view of the tester.

The enclosure 12, as shown in FIGS. 1, 2 and 3, is comprised of a horizontal mounting plate 14, a vertical mounting plate 36, a housing 50, a left housing cover 78 and a right housing cover 94.

The horizontal mounting plate 14 includes a central section 16, a front edge 18, a rear edge 20, a left edge 22, a right edge 24, at least two mounting bores 26 located adjacent the left edge 22, at least two mounting bores 26 located adjacent the right edge 24, a left upward-extending threaded mounting tab 30, and a right upward-extending threaded mounting tab 32.

The vertical mounting plate 36 includes a central section 38, an upper edge 40, a lower edge 42 that is integral with the rear edge 20 of the horizontal mounting plate 14, a left edge 44, a right edge 46, at least two mounting bores 26 that are located adjacent the left edge 44, and at least two mounting bores 26 that are located adjacent the right edge 46.

The housing 50, as also shown in FIGS. 1, 2 and 3, includes a rear vertical section 52 that consists of the central section 38 of the vertical mounting plate 36, an upper horizontal section 56 having a rear edge 58 that is integrally formed with the rear vertical section 52, a front edge 60, a front vertical section 62 having an upper edge 64 that is integrally formed with the front edge 60 of the upper horizontal section 56, a lower edge 66 that is integrally formed with the front edge 18 of the central section 16 of the horizontal mounting plate 14, and a torque transducer bore 74. The upper horizontal section 56 further has a rotary collar bore 68, a left downward-extending threaded mounting tab 70 (not shown) that is in alignment with the left upward-extending threaded mounting tab 30 located on the horizontal mounting plate 14, and a right downward-extending threaded mounting tab 72 that is in alignment with the right upward-extending threaded mounting tab 32 that is located on the horizontal mounting plate 14.

The left housing cover 78, as shown in FIG. 3, has an outer surface 80, an inner surface 82, an upper bore 84 that is in alignment with the left downward-extending threaded mounting tab 70 (not shown), a lower bore 86 that is in alignment with the left upward-extending threaded mounting tab 30, a substantially centered RS232 opening 88 into which is inserted and attached an RS232 receptacle 90. Likewise, the right housing cover 94, as also shown in FIG. 3, has an outer surface 96, an inner surface 98, an upper bore 100 in alignment with the right downward-extending threaded mounting tab 72, a lower bore 102 that is in alignment with the right upward-extending threaded mounting tab 32, and a battery retaining clip 104 that is attached to the inner surface 98.

The articulated display assembly 108, as best shown in FIG. 2, is comprised of a hollow rotary neck 110, an inner rotary collar 116, an outer rotary collar 122, and a rotary neck attachment base 126.

The hollow rotary neck 110 is dimensioned to be rotatably inserted into the rotary collar bore 68 that is located on the upper horizontal section 56 of the housing 50. The neck 110 has an inner end 112 that terminates within the housing 50, and an outer end 114 that is angularly truncated, as shown best in FIG. 2, and that extends above the upper horizontal section 56 of the housing 50. The inner rotary collar 116 is dimensioned to be placed over and attached to the inner end 112 of the rotary neck 110. The inner rotary collar 116 has a horizontal threaded bore 118 into which is threaded a bolt 120 that functions to secure the inner rotary collar 116 and also to provide a stop that limits the lateral rotation of the hollow rotary neck 110 when the bolt 120 abuts with the front vertical section 62 of the housing 50. The outer rotary collar 122, which is dimensioned to be placed over and attached to the outer end of the hollow rotary neck 110, limits the vertical displacement of the rotary neck 110. The rotary neck attachment base 126, as shown in FIGS. 2 and 3, has an inner surface 124 and outer surface 128. The inner surface 124 is fixedly attached to the angularly truncated outer end 114 of the hollow rotary neck 110.

Figure 5:
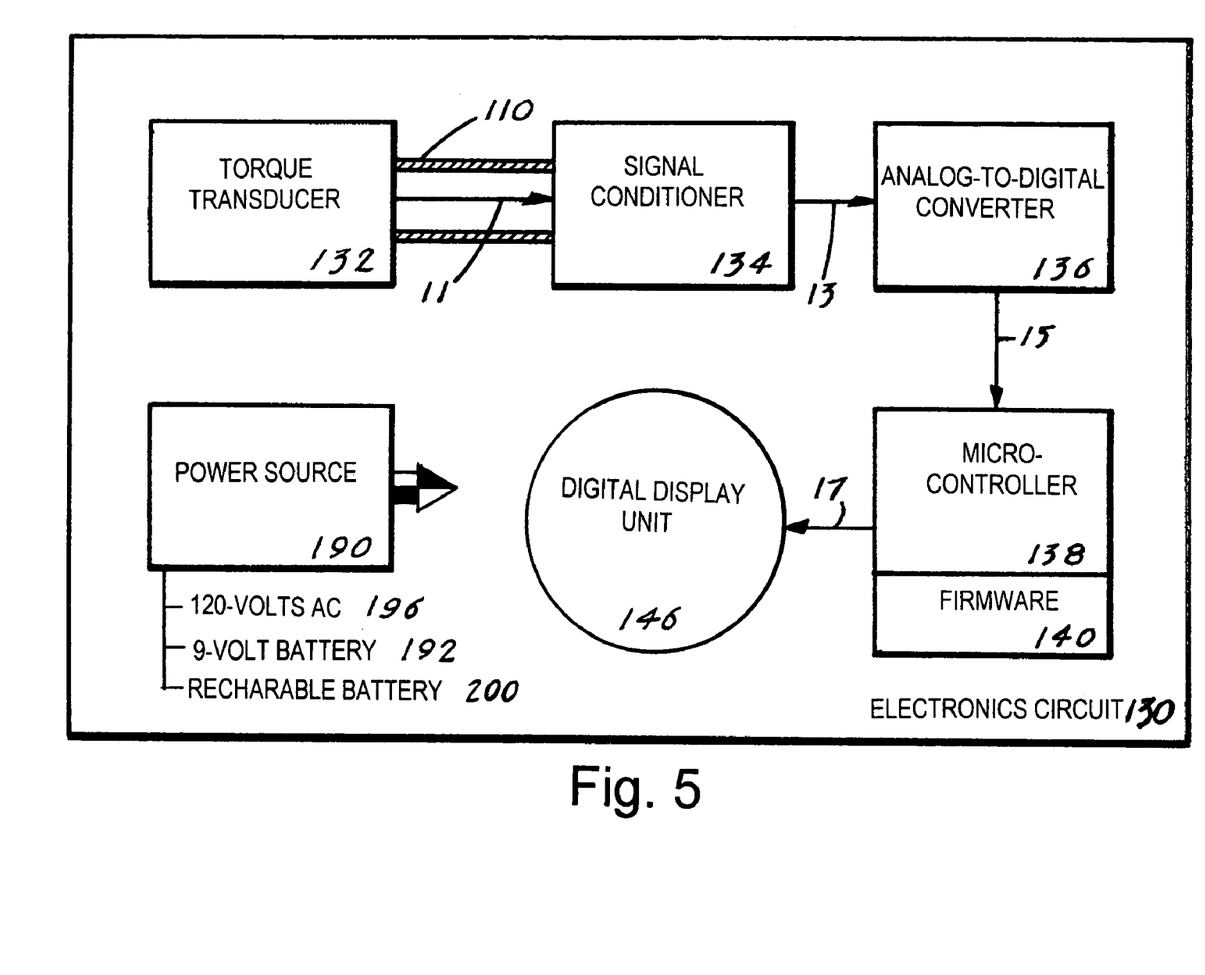
FIG. 5 is a block diagram of the electronics circuit that operates the tester.
Figure 10:
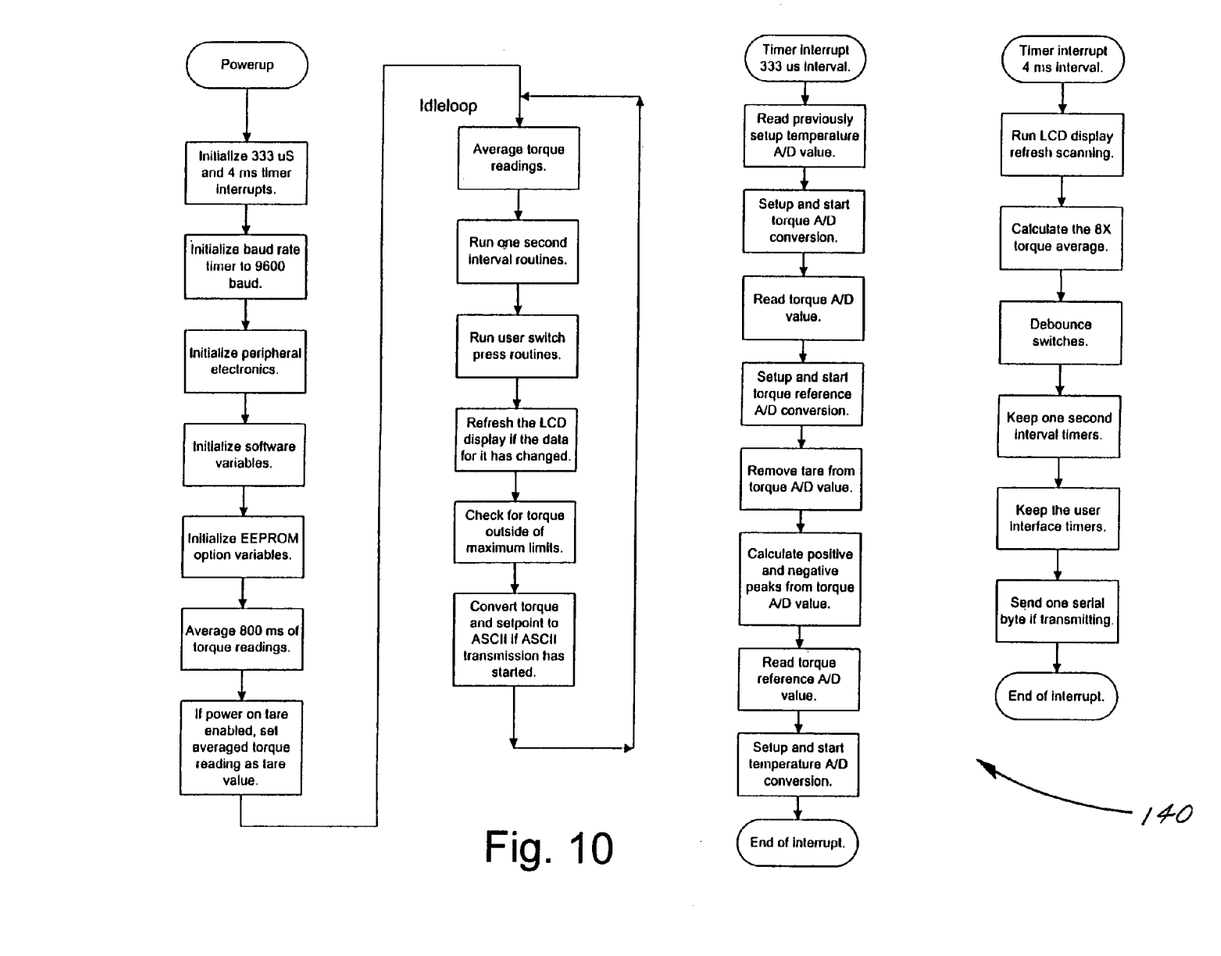
FIG. 10 is a flow diagram of the firmware that operates a microcontroller that comprises an element of the electronics circuit.

The electronics circuit 130 is comprised of four major elements: a torque transducer 132, a signal conditioner 134, an analog-to-digital (ADC) converter 136, and a microcontroller 138 that is operated by firmware 140. The electronic circuit 130 is shown in FIG. 5, and the flow path of the firmware 140 is shown in FIG. 10. All the elements of the electronics circuit 130 are located on a printed circuit board 154, as shown in FIG. 3, that is located on the digital display unit 146, as described infra.

The torque transducer 132, as shown on FIGS. 2 and 3, is rotatably and captively held within the torque transducer bore 74 by means of a pin 75, as shown in FIG. 3, and is enclosed by a torque cover 76. The transducer 132 converts a rotational mechanical force provided by the torque wrench or the torque screwdriver to a corresponding electrical signal 11, as shown in FIG. 5. The signal conditioner 134 receives and amplifies the electrical signal 11 and produces a corresponding analog signal 13. The analog-to-digital converter 136 converts the analog signal 13 to a corresponding digital signal 15.

Figure 4:
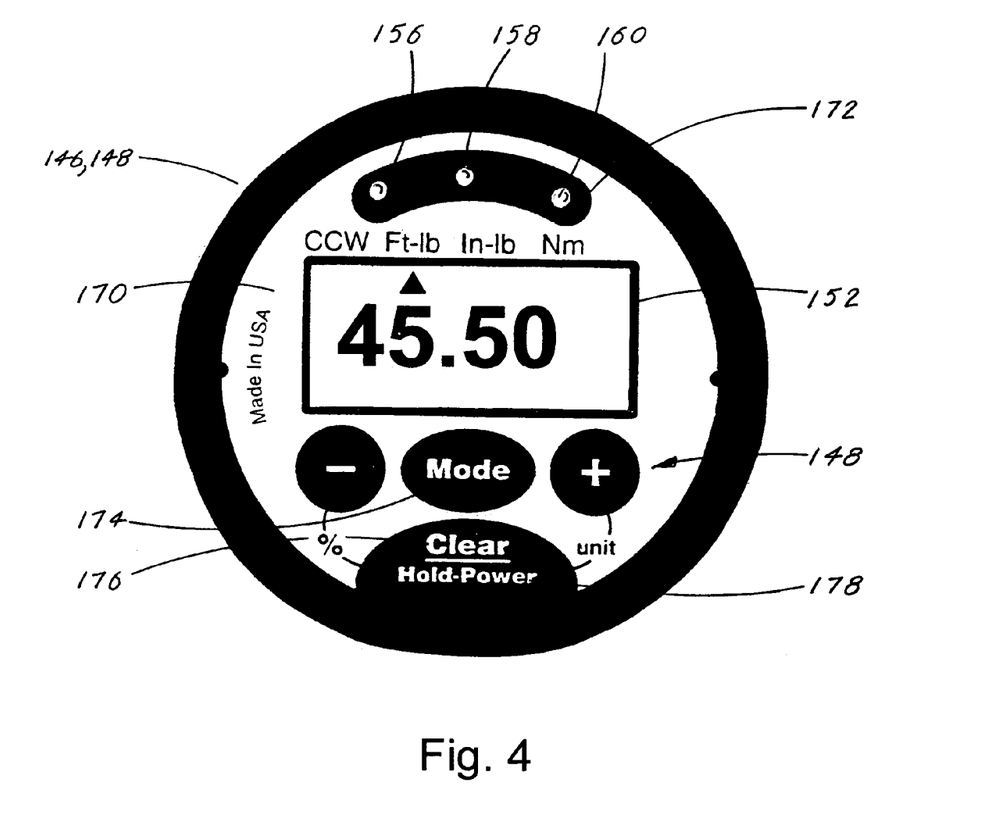
FIG. 4 is a front plan view of a digital display unit.

The microcontroller 138 that operates in combination with the firmware 140 includes means for receiving the digital signal 15 and producing a plurality of display signals 17 that are subsequently received and displayed on the digital display unit 146. As shown in FIGS. 2 and 4, the combination electrical signals 19, as shown in FIG. 3, commence from the torque transducer 132, are sequentially applied through the front vertical section 62 of the housing 50, through the hollow rotary neck 110, and into the digital display unit 146 that is shown attached to the housing 50 in FIG. 1, and the keypad is shown in FIGS. 3 and 4.

The digital display unit 146, as shown in an exploded view in FIG. 3, is comprised of a touch-screen keypad 148, as shown in FIGS. 3 and 4, that is followed sequentially by a rotary bezel 150; an LCD display 152; a printed circuit board 154 that has attached, as shown in FIG. 4, a yellow LED 156, a green LED 158 and a red LED 160; a fixed shell 162; a shell follower 164; and a display guard 166 that is fixed to the outer surface 128 of the rotary neck attachment base 126, as best shown in FIG. 2. The digital display unit 146, as shown in FIG. 4, has a front panel 170 having an opening 172 from where the three LED's 156, 158 and 160 are visible. The front panel 170 also incorporates the LCD display 152, and the screen keypad 148 that includes a MODE switch 174, a CLEAR switch 176, and a HOLD-POWER switch 178.

The digital display 146 is designed to receive the display signals 17 received from the microcontroller 138 that correspond to:

a) a target torque value,
   b) a target torque zone indicated by:
     (1) the yellow LED 156, indicating that a tested target torque value is below the target torque zone,
     (2) the green LED 158, indicating that the tested target torque value is within the target torque zone, and
     (3) the red LED 160, indicating that the tested target torque value is above the target torque zone,
   c) a set of operational modes viewable on the LCD display 152 comprising:
     (1) Peak Hold (P), indicating the maximum measured torque value,
     (2) First Peak (FP), indicating the measured "Click Point" of the torque tool being tested,
     (3) Low Battery (BATT), indicating a low battery voltage, and
     (4) Clear—indicating that data from the display unit has been cleared.

Figure 6:
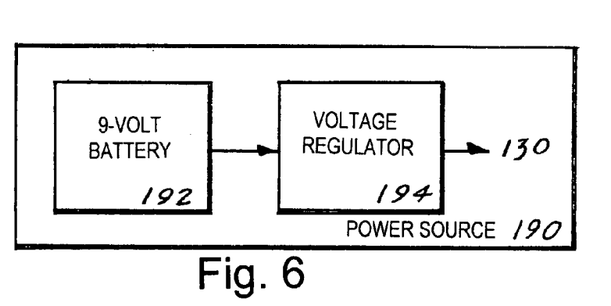
FIG. 6 is a block diagram of a power source comprised of an internally located 9-volt battery.

The final element that comprises the electronic torque-tool tester 10 is the power source 190, as shown in FIGS. 5–9, that can consist of three designs:

The first power source design is comprised of a 9-volt battery 192, as shown in FIG. 6, that is removably attached to the battery retaining clip 104. The clip 104 can be located on the inner surface 98 of the left housing cover 78 or as shown in FIG. 3 on the right housing cover 94. The voltage from the 9-volt battery 192 is applied through a voltage regulator 194 to the electronics circuit 130.

Figure 7:
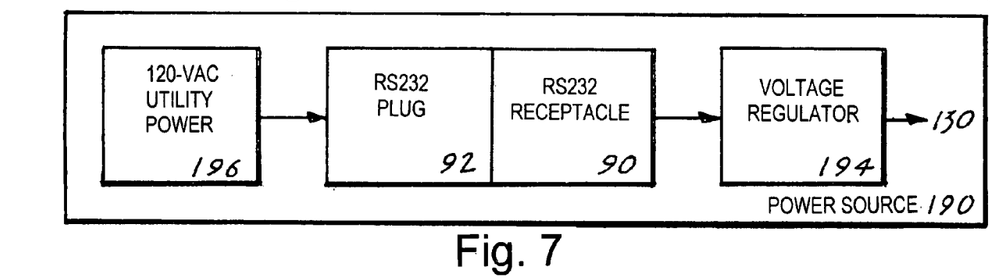
FIG. 7 is a block diagram of a power source comprised of a 120-volt a-c utility power source.

The second power source design is comprised of a 12-volt a-c utility power 196. As shown in FIG. 7, the 120-volts a-c is applied sequentially via an RS232 plug 92, an RS232 receptacle 90 and through a voltage regulator 194 to the electronics circuit 130.

Figure 8:
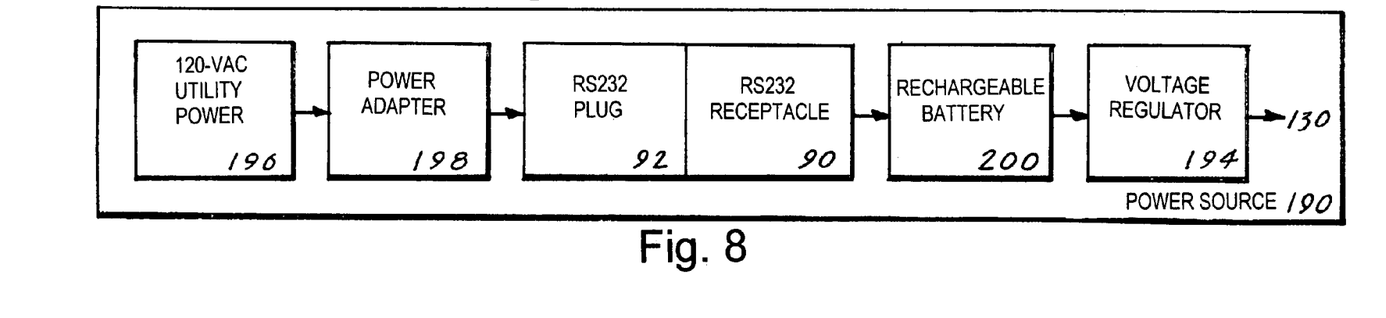
FIG. 8 is a block diagram of a power source comprised of an internally located rechargeable battery.

The third power source design, as shown in FIG. 8, consist of an internal rechargeable battery 200 that is attached to the battery retaining clip 104 and that is recharged by utilizing a power adapter 198. The adapter 198 has an input that is connected to a 120-volt a-c utility power 196 and an output that is applied sequentially via an RS232 plug 92, an RS232 receptacle 90 to the rechargeable battery 200 and through a voltage regulator 194 to the electronics circuit 130.

Figure 9:
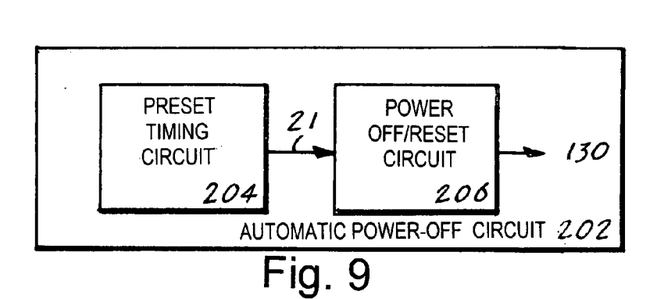
FIG. 9 is a block diagram depicting an automatic power source shut-off circuit.

The power source 190, as shown in FIG. 9, can also be designed to include an automatic power-off circuit 202 that is comprised of a preset timing circuit 204 and a power off/reset circuit 206. The preset timing circuit 204 is preset to produce a switch control signal 21 that is activated when the preset time expires. The signal 21 is applied to the power off/reset circuit, which then terminates the power being applied by the power source 190 to the electronics circuit 130.

The electronic torque-tool tester 10 is designed to be attached to a horizontal surface by inserting screws or bolt and nut combinations 28 into the mounting bores 26 located on the horizontal mounting plate 14. When the tester 10 is attached to a horizontal surface by means of the horizontal mounting plate 14, the torque transducer 132 extends horizontally from the front vertical section 62 of the housing 50, and the articulated display assembly 108 extends vertically from the upper horizontal section 56 of the housing 50. The articulated display assembly 108 can be laterally rotated through a 90 to 350-degree arc and the digital display unit 146 can be rotated through a 90 to 350-degree arc to an optimum viewing position.

The tester 10 can also be attached to a horizontal surface by inserting screws or bolts 28 into the mounting bores 26 located on the vertical mounting plate 36. When the tester 10 is attached to a horizontal surface by means of the vertical mounting plate 36, the torque transducer 132 extends vertically from the front vertical section 62 of the housing 50, and the articulated display assembly 108 extends horizontally from the upper horizontal section 56 of the housing 50. In this second attachment configuration, the articulated display assembly 108 can also be laterally rotated through a 90 to 350-degree arc, and the digital display unit 146 can be rotated through a 90 to 350-degree arc, to provide an optimum viewing position.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the appended claims.

The invention claimed is:

1. An electronic torque-tool tester comprising:
   a) a torque transducer having means for converting a rotational mechanical force that is produced by a torque applying tool, into a corresponding electrical signal,
   b) an electronics circuit having means for converting the electrical signal into a corresponding display signal, and
   c) a digital display unit having means for processing the digital signal and producing a digital display indicative of the torque being produced by said torque applying tool, wherein said digital display unit is rotatably attached to an articulated display assembly that can be laterally rotated either clockwise or counter clockwise through a 90 to 350-degree arc, and said digital display unit can be rotated either clockwise or counter clockwise through a 90 to 350-degree arc, wherein said tool tester is contained within an enclosure comprising:
   (1) a horizontal mounting plate having at least two mounting bores,
   (2) a vertical mounting plate having at least two mounting bores, and
   (3) a housing that is integrally attached to said horizontal mounting plate and said vertical mounting plate, wherein said housing includes an upper horizontal section having a rotary collar bore dimensioned to rotatably retain said articulated display assembly, and a front vertical section having a torque transducer bore dimensioned to retain said torque transducer.

2. The tester as specified in claim 1 wherein said enclosure can be attached to a horizontal surface by inserting screws or bolts into the at least two mounting bores located on the horizontal mounting plate, and wherein when said enclosure is attached to the horizontal surface, said torque transducer extends horizontally from the front vertical section of said housing, and the articulated display assembly extends vertically from the upper horizontal section of said housing.

3. The tester as specified in claim 2 wherein said enclosure can be attached to a horizontal surface by inserting screws or bolts into the at least two mounting bores located on the vertical mounting plate, wherein when the vertical mounting plate of said enclosure is attached to the horizontal surface, said torque transducer extends vertically from the front vertical section of said housing, and said articulated display assembly extends horizontally from the upper horizontal section of said housing.

4. The tester as specified in claim 3 wherein when the horizontal mounting plate is attached to the horizontal surface, said tester is optimally positioned to test torque wrenches, and when the vertical mounting plate is attached to the horizontal surface, said tester is optimally positioned to test torque screwdrivers.

5. An electronic torque-tool tester comprising:
   a) a torque transducer having means for converting a rotational mechanical force that is produced by a torque applying tool, into a corresponding electrical signal,
   b) an electronics circuit having means for converting the electrical signal into a corresponding display signal, and
   c) a digital display unit having means for processing the digital signal and producing a digital display indicative of the torque being produced by said torque applying tool, wherein said digital display unit is rotatably attached to an articulated display assembly that can be laterally rotated either clockwise or counter clockwise through a 90 to 350-degree arc, and said digital display unit can be rotated either clockwise or counter clockwise through a 90 to 350-degree arc, wherein said torque tool tester is contained within an enclosure comprising:
   (1) a horizontal mounting plate having at least two mounting bores,
   (2) a vertical mounting plate having at least two mounting bores, and
   (3) a housing that is integrally attached to said horizontal mounting plate and said vertical mounting plate, wherein said housing includes a front vertical section having a torque transducer bore dimensioned to retain said torque transducer, and an upper horizontal section having a rotary collar bore dimensioned to rotatably retain said articulated display assembly that is further comprised of:
   (a) a hollow rotary neck that is dimensioned to be rotatably inserted into the rotary collar bore located on the upper horizontal section of said housing, wherein said hollow rotary neck has an inner end that terminates within said housing, and an outer end that is angularly truncated and extends above said housing,
   (b) an inner rotary collar that is dimensioned to be placed over and attached to the inner end of said hollow rotary neck, wherein said inner rotary collar having a pair of horizontally oriented bores into which is threaded a pair of bolts that function to secure the inner rotary collar and to provide a stop that limits the lateral rotation of the hollow rotary neck when the bolts abut against the front vertical section of said housing, and
   (c) an outer rotary collar that is dimensioned to be placed over and attached to the outer end of said hollow rotary neck to limit the vertical displacement of said hollow rotary neck.

6. The tester as specified in claim 5 wherein said electronics circuit further comprises:
   a) said torque transducer rotatably and captively held within the torque transducer bore that is located on the front vertical section of said housing, wherein said torque transducer having means for converting the rotational mechanical force produced by the torque applying tool to a corresponding electrical signal, b) a signal conditioner having means for receiving and amplifying the electrical signal and producing a corresponding analog signal, c) an analog-to-digital converter having means for converting the analog signal into a corresponding digital signal, d) a microcontroller that operates in combination with firmware, wherein said microcontroller having means for receiving and processing the digital signal and producing a plurality of display signals that each correspond to a specific torque related value as produced by the torque applying tool, e) said digital display unit having means for processing the display signals and for producing a digital display indicative of the torque being produced by said torque applying tool, and f) a power source that applies a regulated voltage to said electronics circuit.

7. The tester as specified in claim 6 wherein said torque transducer can be calibrated in torque values ranging from inch/pounds to foot/pounds.

8. The tester as specified in claim 6 wherein the digital signals applied from said microcontroller correspond to:

a) a target torque value, b) a target torque zone indicated by:
(1) a yellow LED indicating that a tested target torque value is below the target torque zone,
(2) a green LED indicating that the tested target torque value is within the target torque zone,
(3) a red LED indicating that the tested target torque value is above the target torque zone, c) a set of operational modes comprising:
(1) Peak Hold (P) indicating the maximum measured torque value,
(2) First Peak (FP) indicating the measured "Click Point" of the torque tool being tested,
(3) Low Battery (BATT) indicating a low battery voltage, and d) Clear—indicating that all data from said display unit has been cleared, and e) a power source that applies a regulated voltage to said electronics circuit.

9. An electronic torque-tool tester comprising:

A. an enclosure comprising:
a) a horizontal mounting plate having a central section, a front edge, a rear edge, a left edge, a right edge, at least two mounting bores located adjacent to the left edge, at least two mounting bores located adjacent to the right edge, a left upward-extending threaded mounting tab, and a right upward-extending threaded mounting tab, b) a vertical mounting plate having a central section, an upper edge, a lower edge integral with the rear edge of the horizontal mounting plate, a left edge, a right edge, at least two mounting bores located adjacent to the left edge, and at least two mounting bores located adjacent to the right edge, c) a housing having a rear vertical section consisting of the central section of the vertical mounting plate, an upper horizontal section having a rear edge that is integrally formed with the rear vertical section, a front edge, a front vertical section having an upper edge integrally formed with the front edge of the upper horizontal section, and a lower edge that is integrally formed with the front edge of the central section of the horizontal mounting plate, wherein the upper horizontal section further having a rotary collar bore, a left downward-extending threaded mounting tab that is in alignment with the left upward-extending threaded mounting tab that is located on the horizontal mounting plate, a right downward-extending threaded mounting tab that is in alignment with the right upward-extending threaded mounting tab that is located on the horizontal mounting plate, and wherein the front vertical section further having a torque transducer bore, d) a left housing cover having an outer surface, an inner surface, an upper bore that is in alignment with the left downward-extending threaded mounting tab, a lower bore in alignment with the left upward-extending threaded mounting tab, and a substantially centered RS232 opening into which is inserted and attached an RS232 receptacle, and e) a right housing cover having an outer surface, an inner surface, an upper bore that is in alignment with the right downward-extending threaded mounting tab, a lower bore in alignment with the right upward-extending threaded mounting tab, and a battery retaining clip that is attached to the inner surface of said right housing cover, B. an articulated display assembly comprising:
a) a hollow rotary neck that is dimensioned to be rotatably inserted into the rotary collar bore located on the upper horizontal section of said housing, wherein said hollow rotary neck has an inner end that terminates within said housing, and an outer end that is angularly truncated and that extends above the upper horizontal section, b) an inner rotary collar that is dimensioned to be placed over and attached to the inner end of the hollow rotary neck, wherein said inner rotary collar having a pair of horizontally oriented bores into which is threaded a pair of bolts that function to secure the inner rotary collar and to provide a stop that limits the lateral rotation of the hollow rotary neck when the bolt abut against the front vertical section of said housing, c) an outer rotary collar that is dimensioned to be placed over and attached to the outer end of the hollow rotary neck to limit the vertical displacement of the rotary neck, d) a hollow rotary neck attachment base having an outer surface and an inner surface, wherein the inner surface is attached to the angularly truncated outer end of the hollow rotary neck, C. an electronics circuit comprising:
a) a torque transducer rotatably and captively held within the torque transducer bore located on the front vertical section of said housing, wherein the transducer converts a rotational mechanical force produced by a torque applying tool to a corresponding electrical signal, b) a signal conditioner that receives and amplifies the electrical signal and produces a corresponding analog signal, c) an analog-to-digital converter that converts the analog signal to a corresponding digital signal, d) a microcontroller that operates in combination with firmware, wherein said microcontroller having means for receiving the digital signal and producing a plurality of display signals, D. a display unit rotatably attached by an attachment means to the outer surface of the hollow rotary neck attachment base, wherein said display unit having means for receiving the display signals which correspond to:
  a) a target torque value,
  b) a target torque zone indicated by:
    (1) a yellow LED indicating that a tested target torque value is below the target torque zone,
    (2) a green LED indicating that the tested target torque value is within the target torque zone,
    (3) a red LED indicating that the tested target torque value is above the target torque zone,
  c) a set of operational modes comprising:
    (1) Peak Hold (P) indicating the maximum measured torque value,
    (2) First Peak (FP) indicating the measured "Click Point" of the torque tool being tested,
    (3) Low Battery (BATT) indicating a low battery voltage, and
  d) Clear—indicating that data from said display unit has been cleared, and
E. a power source that applies a regulated voltage to said electronics circuit.

10. The tester as specified in claim 9 wherein said tester can be attached to a horizontal surface by inserting screws or bolts into the at least two mounting bores located on the horizontal mounting plate, wherein when said tester is attached to the horizontal surface, said torque transducer extends horizontally from the front vertical section of said housing, and said articulated display assembly extends vertically from the upper horizontal section of said housing, and wherein said display assembly can be laterally rotated either clockwise or counter clockwise through a 90 to 350-degree arc, and said digital display unit can be rotated either clockwise or counter clockwise through a 90 to 350-degree arc to an optimum viewing position.

11. The tester as specified in claim 9 wherein said tester can be attached to a horizontal surface by inserting screws or bolts into the at least two mounting bores located on the vertical mounting plate, wherein when the vertical mounting plate of said enclosure is attached to the horizontal surface, said torque transducer extends vertically from the front vertical section of said housing, and said articulated display assembly extends horizontally from the upper horizontal section of said housing, and wherein said display assembly can be laterally rotated through a 90 to 350-degree arc and said display unit can be rotated through a 90 to 350-degree arc to an optimum viewing position.

12. The tester as specified in claim 9 wherein said data display unit is comprised of a digital display unit.

13. The tester as specified in claim 12 wherein said digital display unit is further comprised of a touch-screen keypad that is sequentially followed by a rotary bezel, an LCD display, a printed circuit board that includes three LED's, a fixed shell, a shell follower, and a protective display guard that is fixedly attached to the outer surface of the hollow rotary neck attachment bore.

14. The tester as specified in claim 13 wherein said printed circuit board includes the elements comprising the electronics circuit.

15. The tester as specified in claim 9 wherein said power source is comprised of a 9-volt battery that is removably attached to the battery retaining clip that is attached to the inner surface of said right housing cover, and wherein the 9 volts are applied through a voltage regulator to said electronics circuit.

16. The tester as specified in claim 9 wherein said power source is comprised of a 120-volt a-c utility power that is applied sequentially via an RS232 plug, the RS232 receptacle and through a voltage regulator to said electronics circuit.

17. The tester as specified in claim 9 wherein said power source is comprised of a rechargeable battery that is recharged by utilizing a power adapter having an input that is connected to a 120-volt a-c utility power and an output that is applied sequentially via an RS232 plug, the RS232 receptacle and through a voltage regulator to said electronics circuit.

18. The tester as specified in claim 9 further comprising an automatic power/off circuit that automatically shuts-off said power source after a preset dormant period, wherein said automatic power shut-off circuit comprises;
  a) a preset timing circuit is preset to produce a switch control signal when the preset time has expired, and
  b) a power off/reset circuit that when applied the switch control signal power to the electronics circuit is terminated.

* * * * *